United States Patent
Albero et al.

(10) Patent No.: US 12,537,679 B2
(45) Date of Patent: Jan. 27, 2026

(54) SYSTEM FOR CRYPTOGRAPHIC HASH-BASED RECONSTRUCTION OF ELECTRONIC DATA FILES

(71) Applicant: BANK OF AMERICA CORPORATION, Charlotte, NC (US)

(72) Inventors: George Anthony Albero, Charlotte, NC (US); Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 357 days.

(21) Appl. No.: 17/854,511

(22) Filed: Jun. 30, 2022

(65) Prior Publication Data
US 2024/0007285 A1    Jan. 4, 2024

(51) Int. Cl.
*H04L 9/08*    (2006.01)

(52) U.S. Cl.
CPC .................... *H04L 9/088* (2013.01)

(58) Field of Classification Search
CPC .................... H04L 9/088; G06F 21/6218
See application file for complete search history.

(56) References Cited

U.S. PATENT DOCUMENTS

| | | | |
|---|---|---|---|
| 7,454,443 B2 | 11/2008 | Ram | |
| 7,581,118 B2 | 8/2009 | McGovern | |
| 8,099,605 B1 | 1/2012 | Billsrom | |
| 8,285,681 B2 | 10/2012 | Prahlad | |
| 8,370,594 B2 | 2/2013 | Niles | |
| 8,392,371 B2 | 3/2013 | Lam | |
| 8,589,697 B2 | 11/2013 | Subramanian | |
| 8,849,772 B1 | 9/2014 | Huang | |
| 8,909,881 B2 | 12/2014 | Bunte | |
| 9,158,927 B1 | 10/2015 | Franklin | |
| 9,419,801 B2 | 8/2016 | Ackerman | |
| 9,436,840 B2 | 9/2016 | Berengoltz | |
| 9,733,849 B2 | 8/2017 | O'Hare | |
| 10,223,544 B1 | 3/2019 | Pogde | |

(Continued)

OTHER PUBLICATIONS

N. Shang, M. Nabeel, F. Paci and E. Bertino, "A privacy-preserving approach to policy-based content dissemination," 2010 IEEE 26th International Conference on Data Engineering (ICDE 2010), Long Beach, CA, USA, 2010, pp. 944-955 (IEEE 2010) (Year: 2010).*

*Primary Examiner* — Theodore C Parsons
(74) *Attorney, Agent, or Firm* — Moore & Van Allen PLLC; Nicholas C. Russell

(57) ABSTRACT

A system is provided for cryptographic hash-based reconstruction of electronic data files. In particular, the system may comprise a data reconstruction database containing entries for elements of electronic data files. Each element and/or entry within the data reconstruction database may be associated with a unique tag or identifier. Accordingly, when data files are generated and/or stored by the system, the data files may comprise an ordered list of one or more identifiers. Based on the identifiers with the data files, the system may dynamically reconstruct the contents of the data files. The system may further use cryptographic keys or hash values to provide secured access control to the data files. In this way, the system may provide an efficient and secure way to store and generate electronic data files and provide secured access thereto.

14 Claims, 4 Drawing Sheets

(56) References Cited

U.S. PATENT DOCUMENTS

| | | | |
|---|---|---|---|
| 10,380,141 B1 | 8/2019 | Chepel | |
| 10,402,571 B2 | 9/2019 | Nayshtut | |
| 2005/0138110 A1* | 6/2005 | Redlich | G06F 21/6254 |
| | | | 709/201 |
| 2006/0080535 A1 | 4/2006 | Elazar | |
| 2012/0166576 A1* | 6/2012 | Orsini | H04L 67/1097 |
| | | | 709/217 |
| 2014/0281518 A1 | 9/2014 | Erofeev | |
| 2015/0067810 A1* | 3/2015 | Ahuja | H04L 63/1416 |
| | | | 726/9 |
| 2015/0186488 A1 | 7/2015 | Fischer | |
| 2019/0121990 A1 | 4/2019 | Haager | |
| 2020/0341854 A1 | 10/2020 | Morton | |
| 2021/0377016 A1 | 12/2021 | Perlman | |
| 2022/0358236 A1* | 11/2022 | Taylor | H04L 9/0618 |

\* cited by examiner

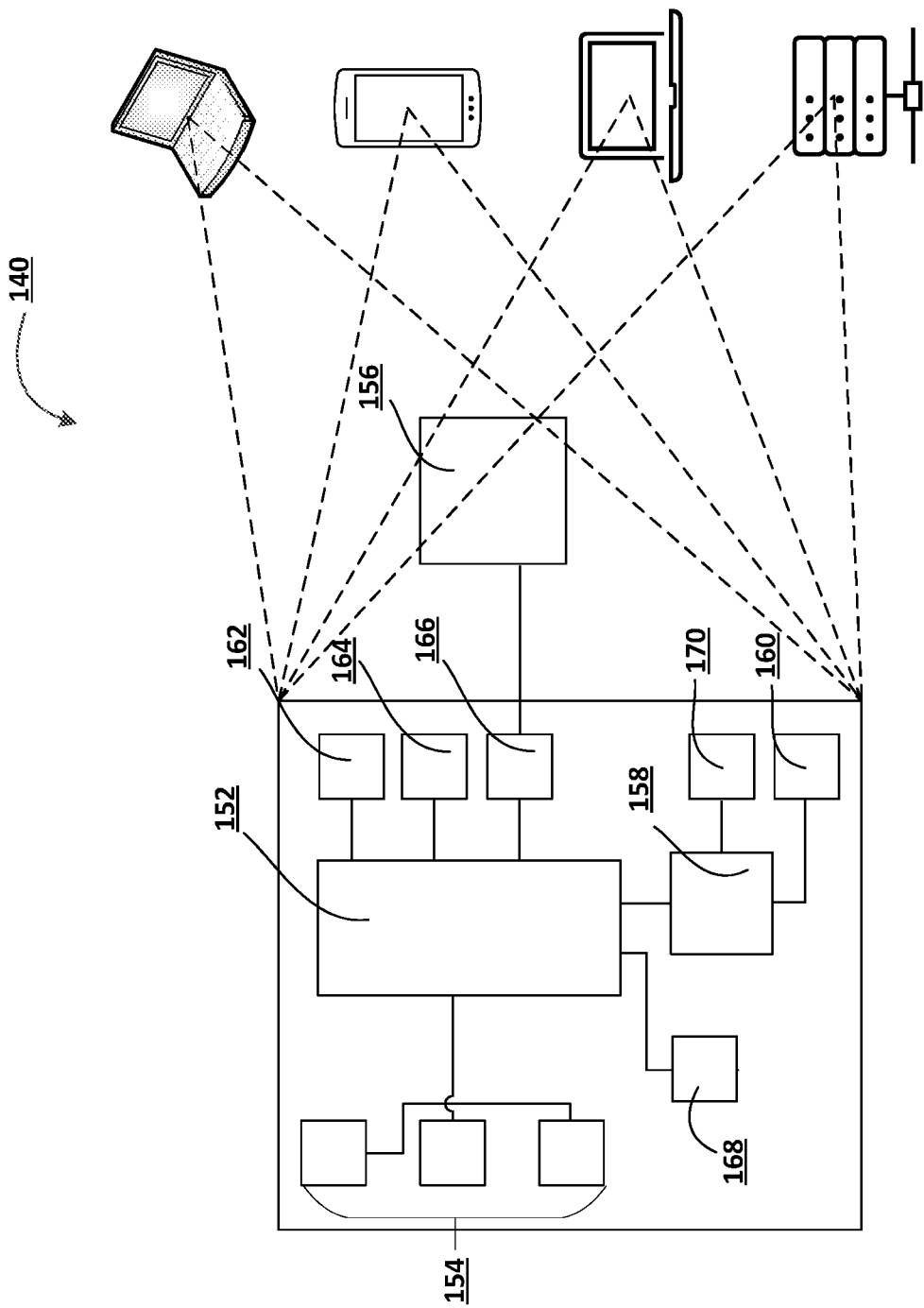

SYSTEM FOR CRYPTOGRAPHIC HASH-BASED RECONSTRUCTION OF ELECTRONIC DATA FILES

FIELD OF THE INVENTION

The present invention embraces a system for cryptographic hash-based reconstruction of electronic data files.

BACKGROUND

There is a need for an efficient way to store and access electronic data files.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for cryptographic hash-based reconstruction of electronic data files. In particular, the system may comprise a data reconstruction database containing entries for elements of electronic data files. Each element and/or entry within the data reconstruction database may be associated with a unique tag or identifier. Accordingly, when data files are generated and/or stored by the system, the data files may comprise an ordered list of one or more identifiers. Based on the identifiers with the data files, the system may dynamically reconstruct the contents of the data files. The system may further use cryptographic keys or hash values to provide secured access control to the data files. In this way, the system may provide an efficient and secure way to store and generate electronic data files and provide secured access thereto.

Accordingly, embodiments of the present disclosure provide a system for cryptographic hash-based reconstruction of electronic data files, the system comprising at least one non-transitory storage device; and at least one processor coupled to the at least one non-transitory storage device, wherein the at least one processor is configured to receive, from an endpoint device, a request to access a data file and a private key associated with the endpoint device; validate the private key based on metadata associated with the private key and historical metadata associated with the private key; retrieve, from a data reconstruction database, a data reconstruction template associated with the data file; dynamically reconstruct the data file according to the data reconstruction template, wherein the data reconstruction template comprises one or more identifiers for data elements within the data file; and provision access to the data file to the endpoint device.

In some embodiments, validating the private key comprises determining that the endpoint device is authorized to access at least a portion of the data file, wherein dynamically reconstructing the data file comprises selectively reconstructing the data file to include the portion of the data file that the endpoint device is authorized to access.

In some embodiments, validating the private key comprises determining that the endpoint device is unauthorized to access the data file, wherein the data file is a decoy data file comprising obfuscated data.

In some embodiments, wherein the data reconstruction template comprises an ordered sequence of identifiers, wherein each identifier is uniquely associated with a data element used to reconstruct the data file, wherein each data element is stored within a data elements database.

In some embodiments, each data element within the data elements database comprises at least one of a character string or a media data file.

In some embodiments, the at least one processor is further configured to detect that a user associated with the endpoint device is no longer registered; and automatically revoke access rights associated with the private key.

In some embodiments, provisioning access to the data file comprises providing selective access to the data file based on the private key.

Embodiments of the present disclosure also provide a computer program product for cryptographic hash-based reconstruction of electronic data files, the computer program product comprising a non-transitory computer-readable medium comprising code causing an apparatus to receive, from an endpoint device, a request to access a data file and a private key associated with the endpoint device; validate the private key based on metadata associated with the private key and historical metadata associated with the private key; retrieve, from a data reconstruction database, a data reconstruction template associated with the data file; dynamically reconstruct the data file according to the data reconstruction template, wherein the data reconstruction template comprises one or more identifiers for data elements within the data file; and provision access to the data file to the endpoint device.

In some embodiments, validating the private key comprises determining that the endpoint device is authorized to access at least a portion of the data file, wherein dynamically reconstructing the data file comprises selectively reconstructing the data file to include the portion of the data file that the endpoint device is authorized to access.

In some embodiments, validating the private key comprises determining that the endpoint device is unauthorized to access the data file, wherein the data file is a decoy data file comprising obfuscated data.

In some embodiments, the data reconstruction template comprises an ordered sequence of identifiers, wherein each identifier is uniquely associated with a data element used to reconstruct the data file, wherein each data element is stored within a data elements database.

In some embodiments, each data element within the data elements database comprises at least one of a character string or a media data file.

In some embodiments, the code further causes the apparatus to detect that a user associated with the endpoint device is no longer registered; and automatically revoke access rights associated with the private key.

Embodiments of the present disclosure also provide a computer-implemented method for cryptographic hash-based reconstruction of electronic data files, the computer-implemented method comprising receiving, from an endpoint device, a request to access a data file and a private key associated with the endpoint device; validating the private key based on metadata associated with the private key and historical metadata associated with the private key; retrieving, from a data reconstruction database, a data reconstruction template associated with the data file; dynamically reconstructing the data file according to the data reconstruction template, wherein the data reconstruction template comprises one or more identifiers for data elements within the data file; and provisioning access to the data file to the endpoint device.

In some embodiments, validating the private key comprises determining that the endpoint device is authorized to access at least a portion of the data file, wherein dynamically reconstructing the data file comprises selectively reconstructing the data file to include the portion of the data file that the endpoint device is authorized to access.

In some embodiments, validating the private key comprises determining that the endpoint device is unauthorized to access the data file, wherein the data file is a decoy data file comprising obfuscated data.

In some embodiments, the data reconstruction template comprises an ordered sequence of identifiers, wherein each identifier is uniquely associated with a data element used to reconstruct the data file, wherein each data element is stored within a data elements database.

In some embodiments, each data element within the data elements database comprises at least one of a character string or a media data file.

In some embodiments, the computer-implemented method further comprises detecting that a user associated with the endpoint device is no longer registered; and automatically revoking access rights associated with the private key.

In some embodiments, provisioning access to the data file comprises providing selective access to the data file based on the private key.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
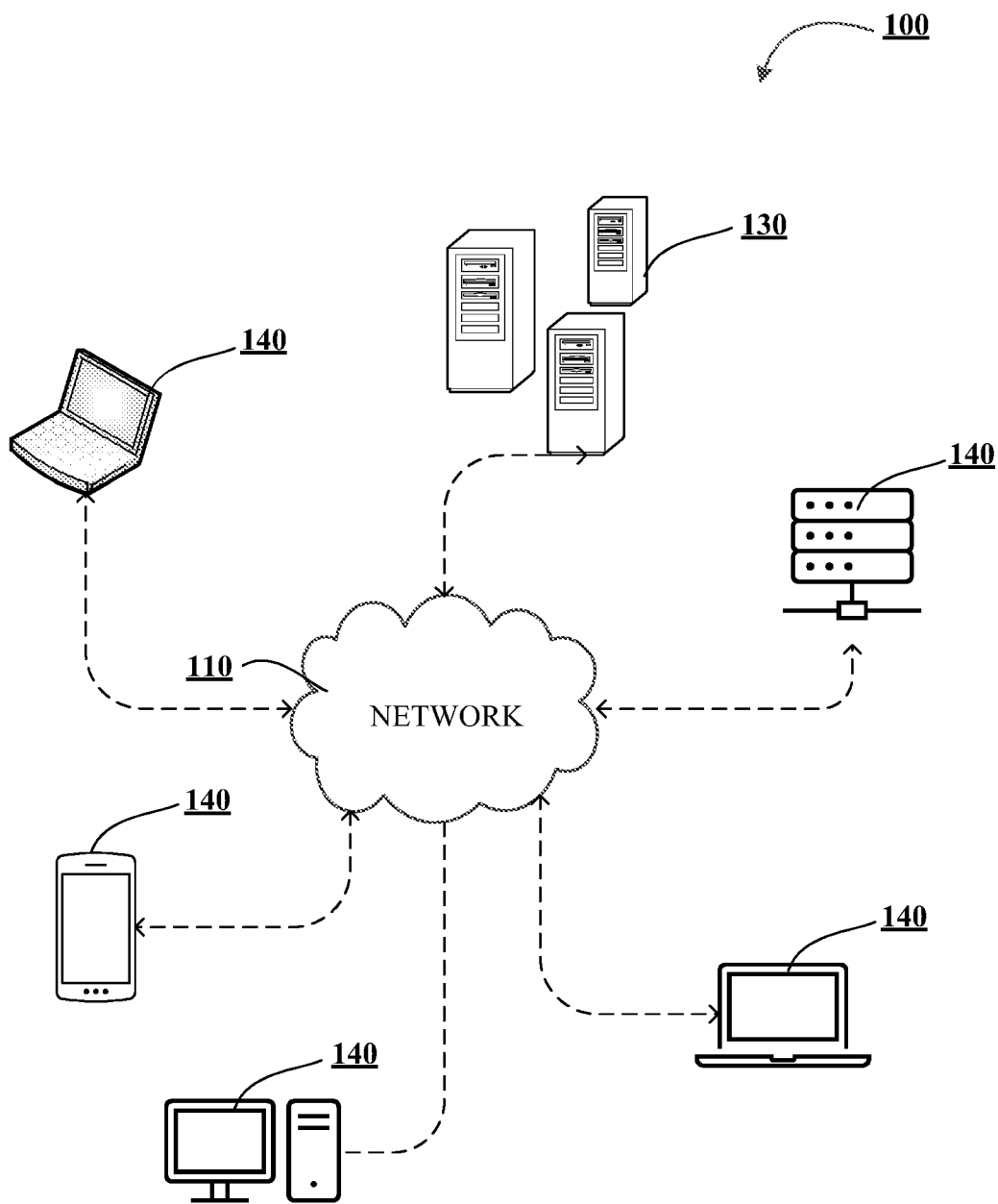
Figure 1B:
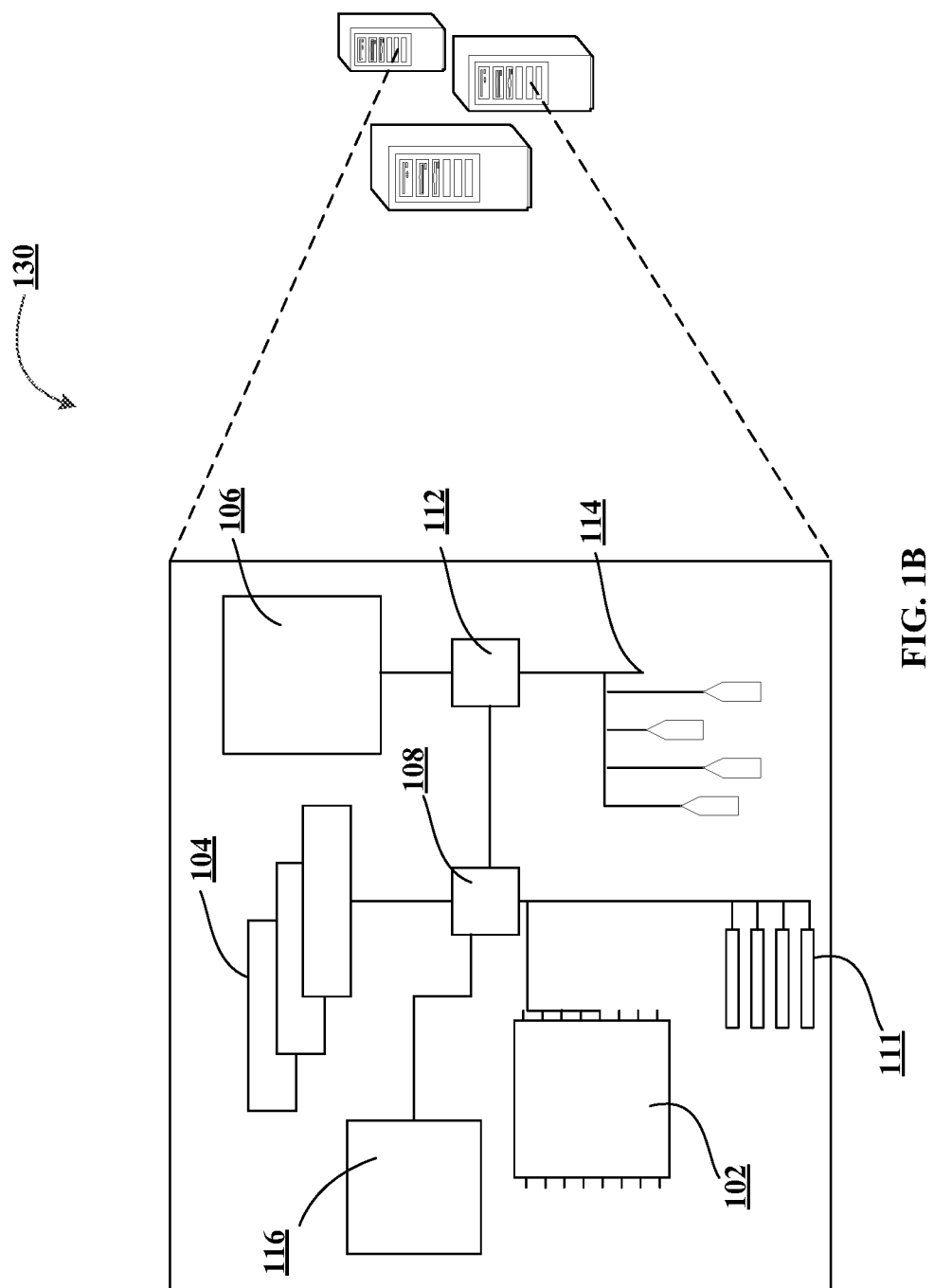
Figure 2:
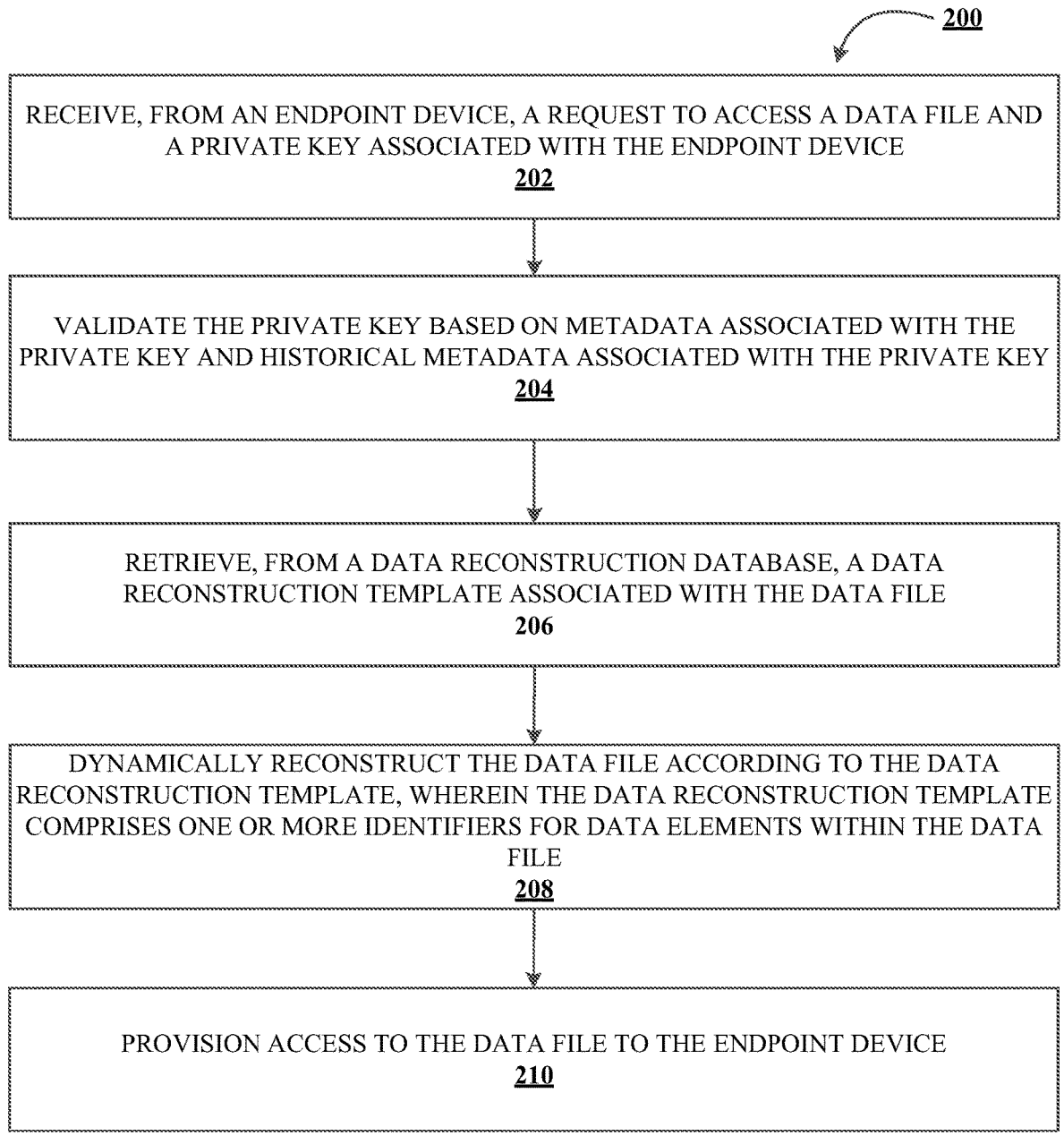

Having thus described embodiments of the invention in general terms, reference will now be made the accompanying drawings, wherein:

FIGS. 1A-1C illustrates technical components of an exemplary distributed computing environment for the system for cryptographic hash-based reconstruction of electronic data files, in accordance with an embodiment of the present disclosure;

FIG. 2 illustrates a process flow for cryptographic hash-based reconstruction of electronic data files, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "computing resource" or "resource" may generally refer to physical and/or virtual components or materials that are used in the operation of a computing device. Accordingly, examples of such resources may include processing power, memory allocation, cache space, storage space, data files, network connections and/or bandwidth, electrical power, input/output functions, and the like.

"Cryptographic function" or "cryptographic algorithm" as used herein may refer to a set of logical and/or mathematical operations or processes that may be executed on a specified segment of data to produce a cryptographic output (or "cypher"). In some embodiments, the cryptographic algorithm may be an algorithm such as Rivest-Shamir-Adleman ("RSA"), Shamir's Secret Sharing ("SSS"), or the like. In other embodiments, the cryptographic algorithm may be a hash algorithm which may, given a specified data input, produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

An enterprise environment may comprise numerous electronic data files stored across multiple computing devices and/or hardware devices within the network. Over time, an entity's data storage requirements may grow to immense proportions, which may in turn necessitate costly hardware storage capacity upgrades. Furthermore, the sheer number of data files stored in the network may pose certain challenges to managing the data (e.g., data security, privacy, and the like). Accordingly, there is a need for an efficient and secure way to store and/or recall electronic data within the network.

To address the foregoing needs among others, the present disclosure provides for a system for cryptographic hash-based reconstruction of electronic data files. The system may comprise a data reconstruction database comprising one or more entries, where each entry may comprise a unique element to be used in reconstructing data files. For instance, in embodiments in which the data file to be reconstructed is a document, the data reconstruction database may comprise entries for the various images, audio samples, video samples, and/or words needed to reconstruct the document. Each entry within the data reconstruction database may be associated with a unique identifier. Accordingly, the system may generate a template from the document file to be stored, where the data reconstruction template comprises one or more identifiers along with an order and/or location in which the elements associated with the identifiers will appear in the data file.

For instance, if the data file is a document containing a number of sentences and an image file (e.g., a photograph), the data reconstruction template may include information that specifies the location of the image file (e.g., in the upper right corner of the document offset by 100 pixels from the top and bottom), fonts and/or other typographical information, and the order in which the words will appear within the document. In such embodiments, the identifiers may serve as pointers to the relevant entries within the data reconstruction database. In this way, rather than storing data files containing duplicate instances of data, the data reconstruction template may serve as a blueprint for efficiently regenerating the documents. For instance, a data reconstruction template for a document file may, rather than containing duplicate entries of the word "the," contain references to the identifier associated with the word "the" within the data reconstruction database along with the instances and/or order in which the word appears within the document.

In some embodiments, the system may be configured to dynamically reconstruct data files upon request by the user. For instance, the system may receive, from the user, a request to open or access a specific data file (e.g., a document file). In such embodiments, the system may require the user to provide a private key (e.g., a hash value) associated with the requested data file and uniquely associated with the user in order to gain access to the data file. The system may authenticate the user using the private key (e.g., decrypting the data file by matching the private key provided by the user with a public key associated with the data file) to provide selective access to one or more portions of the data file to the user. In some embodiments, the system may further log the interactions of users and/or computing systems with each data file. For instance, the system may log instances in which a particular private key was used to access the data file along with a timestamp associated with each instance. In this way, the system may maintain a record of which computing systems were used to access a particular data file.

In some embodiments, the system may be configured to restrict and/or allow access to certain portions of a data file based on the private key used to gain access to said data file. For instance, in embodiments in which the data file is a document file, the system may, with respect to a particular private key or user, be configured to allow access to certain portions of the document (e.g., certain paragraphs, sections, pages, or the like) while restricting access to the remaining portions. Accordingly, the system may grant selective access to certain users (e.g., employees) and full access to other users (e.g., administrators, managers, or the like), thereby allowing for the fine-tuning of security levels to match the data file to be protected.

In some embodiments, the system may further be configured to detect a potential compromise of a private key. For instance, the system may detect, based on historical usage data associated with the private key, that the private key has been used from a device, location, time window, or context that is unusual. To illustrate, an authorized user may routinely use a desktop computer from a particular geographic location at a specific timeframe (e.g., evenings) to access the data files stored within the system's network. If the private key is then used by an unauthorized user in a way that is inconsistent with the historical usage of the private key, the system may determine that the private key has potentially been compromised. In such cases, the system may take one or more remediation actions in response to the compromise of the private key. For example, the system may block the private key from subsequently being used to access any of the data files within the network, or may generate and present a decoy data file (e.g., a document file containing obfuscated or incorrect information) to the unauthorized user.

Furthermore, the system may be determined to alter access privileges based on detecting the occurrence of certain events or conditions associated with a private key and/or the user associated with the private key. For example, a user who may be an employee of an entity may be provisioned a private key to access certain data files. Upon termination of the relationship between the user and the entity (e.g., the user has departed the entity), the system may take one or more remediation actions such as automatically disabling the private key associated with the user.

An exemplary embodiment is provided as follows. It should be understood that the following example is provided for illustrative purposes only and is not intended to restrict or limit the scope of the disclosure herein. In an exemplary embodiment, a user may select a data file (e.g., a document file) to be accessed (e.g., through a user interface on an endpoint device associated with the user). For instance, the user may double click an icon on the user interface, where the icon is associated with a certain data file within the system. By selecting the icon, the endpoint device associated with the user may be configured to transmit a request to access the data file along with a private key associated with the user. Upon receiving the request from the user to access the data file, the system may read the private key received from the endpoint device and validate the private key (e.g., by verifying whether the private key is authorized to access the data file). Based on validating the private key, the system may determine that the user is authorized to access at least a portion of the document file. Upon determining the user is authorized to access the file, the system may access a data reconstruction template associated with the requested data file from the data reconstruction database. The data reconstruction template may include information such as a series of identifiers corresponding to the text within the document file and/or other types of information (e.g., information on media files, placement of such files, fonts, text sizes and/or formatting information, and the like). Using the data reconstruction template, the system may dynamically generate a reconstructed version of the data file and provision access to the reconstructed version to the endpoint device. If the user and/or endpoint device is only authorized to access a portion of the document, the reconstructed version may contain only the sections that the user or endpoint device is authorized to access.

The present disclosure provides a technical solution to the technical problem of allocating data storage space in the face of ever-increasing data storage requirements. Specifically, the technical solution presented herein provides a way to dynamically regenerate data files on a real-time, on-demand basis through intelligent reconstruction using data templates, which may save terabytes and petabytes of storage space within the enterprise network environment. Furthermore, the system provides a way to exercise granular access controls on data files, thereby increasing the security of the network environment as a whole.

FIGS. 1A-1C illustrate technical components of an exemplary distributed computing environment 100 for the system for cryptographic hash-based reconstruction of electronic data files, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 cryptographic hash-based reconstruction of electronic data files, in accordance with an embodiment of the present disclosure. The process begins at block 202, where the system receives, from an endpoint device, a request to access a data file and a private key associated with the endpoint device. In some embodiments, the endpoint device may be a computing device operated by a user, such as an employee or agent associated with the entity. In other embodiments, the user may be a third party who may have an established relationship with the entity (e.g., a customer of the entity, a vendor for the entity, or the like).

In some embodiments, the data file may be a document file or a multimedia file (e.g., a file containing image and/or audio data). The request to access the data file may be transmitted by the endpoint device in response to an action taken by the user within the user interface presented on the display of the endpoint device. For instance, the action may be a selection of the data file (e.g., interacting with an icon associated with the data file through one or more mouse clicks, touch inputs, voice commands, or the like).

In some embodiments, once the data file has been selected by the user, the endpoint device may prompt the user (e.g., through the user interface) to enter a private key uniquely associated with the user. In other embodiments, the private key may be securely stored within the storage of the endpoint device and will be automatically transmitted to the system along with the request to access the data file.

The process continues to block 204, where the system validates the private key based on metadata associated with the private key and historical metadata associated with the private key. In some embodiments, validating the private key may comprise gathering metadata associated with the private key and/or the request to access the data file, where such metadata may comprise information such as an endpoint device ID, geographic location and/or IP address, timestamp of the request, and the like. The system may then access a historical database to retrieve historical metadata associated with the private key and/or the request, where such historical metadata may include information such as previous instances of data access using the private key, historical timeframes in which the private key was used, geographic location history, and the like. Upon comparing the metadata associated with the request and the private key with the historical metadata associated with the request and the private key, the system may determine that the endpoint device is authorized to access at least a portion of the requested data file. In such embodiments, the system may continue to the next step in the process flow. However, in some embodiments, the system may determine that the endpoint device is unauthorized to access the data file. In such embodiments, the system may execute one or more remediation processes to protect the data file. For instance, the system may block the endpoint device from attempting to access the data file and/or any other data files stored in the network environment. Alternatively, the system may generate a decoy data file containing invalid information and/or obfuscated data, which may be generated by reading the identifiers within data reconstruction template associated with the data file and applying an obfuscation algorithm to the data elements corresponding with the identifiers. Once the decoy data file has been generated, the system may present the decoy data file to the endpoint device.

The process continues to block 206, where the system retrieves, from a data reconstruction database, a data reconstruction template associated with the data file. The data reconstruction template may contain an ordered sequence of identifiers, where each identifier is uniquely associated with a data element for generating the data file. For instance, in embodiments in which the data file is a document file, the data elements may be character strings (e.g., words) and/or images found within the data file. Accordingly, rather than storing the data file in its entirety, the data reconstruction template may specify the order, placement, and formatting of the data elements within the reconstructed data file. In this way, duplicated data elements within the data file may be expressed through the use of their corresponding identifiers within the data reconstruction template.

The process continues to block 208, where the system dynamically reconstructs the data file according to the data reconstruction template, wherein the data reconstruction template comprises one or more identifiers for data elements within the data file. In particular, the system may reconstruct the data file according to the sequence of identifiers along with the placement and/or formatting information found within the data reconstruction template. In some embodiments, reconstructing the data file may comprise retrieving the data elements from a data elements database. The data elements database may comprise data such as character strings or media files (e.g., image, video, and/or audio files) that may be associated with the identifiers as listed in the data reconstruction database. Accordingly, once the data elements are pulled from the data elements database, the system may populate the data file with the retrieved data elements in accordance with the data reconstruction template.

The process concludes at block 210, where the system provisions access to the data file to the endpoint device. In some embodiments, the system may determine, based on validating the private key, that the endpoint device is only authorized to access a portion of the data file. In such embodiments, provisioning access may include providing selective access (e.g., limiting or restricting the scope of the access to only certain portions of the data file) based on the private key received from the endpoint device. In this regard, the reconstructed data file may be a redacted or partial data file comprising only the information that the endpoint device is authorized to access. In other embodiments, the system may determine that the endpoint device is authorized to access the entirety of the data file. In such embodiments, the system may fully reconstruct the data file according to the data reconstruction template.

In some embodiments, the system may be configured to implement one or more access controls based on detecting a change in status of the endpoint device and/or the user associated with the endpoint device. For instance, if the system detects that the user will be away for an extended period of time (e.g., due to a leave of absence or holiday), the system may temporarily suspend use of the private key associated with the user. In other embodiments, if the system detects that the user is no longer registered within the entity's network (e.g., the relationship between the entity and the user has been severed), the system may automatically revoke access rights associated with the private key. In this way, the system provides an efficient way to provide selective access to the data files within the network.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cryptographic hash-based reconstruction of electronic data files, the system comprising:
   at least one non-transitory storage device; and
   at least one processor coupled to the at least one non-transitory storage device, wherein the at least one processor is configured to:
   receive, from an endpoint device, a request to access a data file and a private key associated with the endpoint device;
   validate the private key based on metadata associated with the private key and historical metadata associated with the private key, wherein validating the private key comprises determining the endpoint device is authorized to access at least a portion of the data file, wherein authorization to access at least a portion of the data file is assigned from an application, wherein historical metadata associated with the private key comprises previous instances of data access using the private key, historical timeframes the private key was used, and a geographic location;
   log interactions of the endpoint device with the data file by logging the private key and a timestamp;
   retrieve, from a data reconstruction database, a data reconstruction template associated with the data file;
   dynamically reconstruct the data file according to the data reconstruction template, wherein the data reconstruction template comprises one or more identifiers for data elements within the data file, wherein dynamically reconstructing the data file comprises selectively reconstructing the data file to include the portion of the data file that the endpoint device is authorized to access, wherein the data reconstruction template further comprises an order and a location in which the data elements appear within the data file, wherein the data reconstruction template further comprises an ordered sequence of identifiers, wherein each identifier is uniquely associated with a data element used to reconstruct the data file and duplicated data elements are expressed through individual corresponding identifiers within the data reconstruction template, wherein each data element within a data elements database comprises at least one of a character string or a media data file, wherein each data element is stored within a data elements database, wherein reconstructing the data file further comprises:
  retrieving the data elements from the data reconstruction database; and
  generating the data file based on the order and the location in which the data elements appear within the data file; and
provision access to the data file to the endpoint device.

2. The system of claim 1, wherein the at least one processor is further configured to:
  detect that a user associated with the endpoint device is no longer registered; and
  automatically revoke access rights associated with the private key.

3. The system of claim 1, wherein provisioning access to the data file comprises providing selective access to the data file based on the private key.

4. The system of claim 1, wherein the data file comprises a multimedia file.

5. The system of claim 1, wherein the data file comprises a document file.

6. A computer program product for cryptographic hash-based reconstruction of electronic data files, the computer program product comprising a non-transitory computer-readable medium comprising code causing an apparatus to:
  receive, from an endpoint device, a request to access a data file and a private key associated with the endpoint device;
  validate the private key based on metadata associated with the private key and historical metadata associated with the private key, wherein validating the private key comprises determining the endpoint device is authorized to access at least a portion of the data file, wherein authorization to access at least a portion of the data file is assigned from an application, wherein historical metadata associated with the private key comprises previous instances of data access using the private key, historical timeframes the private key was used, and a geographic location;
  log interactions of the endpoint device with the data file by logging the private key and a timestamp;
  retrieve, from a data reconstruction database, a data reconstruction template associated with the data file;
  dynamically reconstruct the data file according to the data reconstruction template, wherein the data reconstruction template comprises one or more identifiers for data elements within the data file, wherein dynamically reconstructing the data file comprises selectively reconstructing the data file to include the portion of the data file that the endpoint device is authorized to access, wherein the data reconstruction template further comprises an order and a location in which the data elements appear within the data file, wherein the data reconstruction template further comprises an ordered sequence of identifiers, wherein each identifier is uniquely associated with a data element used to reconstruct the data file and duplicated data elements are expressed through individual corresponding identifiers within the data reconstruction template, wherein each data element within a data elements database comprises at least one of a character string or a media data file, wherein each data element is stored within a data elements database, wherein reconstructing the data file further comprises:
    retrieving the data elements from the data reconstruction database; and
    generating the data file based on the order and the location in which the data elements appear within the data file; and
  provision access to the data file to the endpoint device.

7. The computer program product of claim 6, wherein the code further causes the apparatus to:
  detect that a user associated with the endpoint device is no longer registered; and
  automatically revoke access rights associated with the private key.

8. The computer program product of claim 6, wherein the data file comprises a multimedia file.

9. The computer program product of claim 6, wherein the data file comprises a document file.

10. A computer-implemented method for cryptographic hash-based reconstruction of electronic data files, the computer-implemented method comprising:
  receiving, from an endpoint device, a request to access a data file and a private key associated with the endpoint device;
  validating the private key based on metadata associated with the private key and historical metadata associated with the private key, wherein validating the private key comprises determining the endpoint device is authorized to access at least a portion of the data file, wherein authorization to access at least a portion of the data file is assigned from an application, wherein historical metadata associated with the private key comprises previous instances of data access using the private key, historical timeframes the private key was used, and a geographic location;
  logging interactions of the endpoint device with the data file by logging the private key and a timestamp;
  retrieving, from a data reconstruction database, a data reconstruction template associated with the data file;
  dynamically reconstructing the data file according to the data reconstruction template, wherein the data reconstruction template comprises one or more identifiers for data elements within the data file, wherein dynamically reconstructing the data file comprises selectively reconstructing the data file to include the portion of the data file that the endpoint device is authorized to access, wherein the data reconstruction template further comprises an order and a location in which the data elements appear within the data file, wherein the data reconstruction template further comprises an ordered sequence of identifiers, wherein each identifier is uniquely associated with a data element used to reconstruct the data file and duplicated data elements are expressed through individual corresponding identifiers within the data reconstruction template, wherein each data element within a data elements database comprises at least one of a character string or a media data file, wherein each data element is stored within a data elements database, wherein reconstructing the data file further comprises:

retrieving the data elements from the data reconstruction database; and generating the data file based on the order and the location in which the data elements appear within the data file; and provisioning access to the data file to the endpoint device.

11. The computer-implemented method of claim 10, wherein the computer-implemented method further comprises:

detecting that a user associated with the endpoint device is no longer registered; and automatically revoking access rights associated with the private key.

12. The computer-implemented method of claim 10, wherein provisioning access to the data file comprises providing selective access to the data file based on the private key.

13. The computer-implemented method of claim 10, wherein the data file comprises a multimedia file.

14. The computer-implemented method of claim 10, wherein the data file comprises a document file.

\* \* \* \* \*